(12) United States Patent
Beenken et al.

(10) Patent No.: US 9,783,135 B2
(45) Date of Patent: Oct. 10, 2017

(54) NUMBER PLATE PREFERABLY MOTOR VEHICLE NUMBER PLATE AND METHOD FOR PRODUCTION THEREOF

(75) Inventors: Björn Beenken, Ganderkesee-Rethorn (DE); Dietmar Mönning, Oldenburg (DE)

(73) Assignee: Tönnjes ISI Patent Holding GmbH, Delmenhorst (DE)

( * ) Notice: Subject to any disclaimer, the term of this patent is extended or adjusted under 35 U.S.C. 154(b) by 1342 days.

(21) Appl. No.: 13/144,303

(22) PCT Filed: Jan. 22, 2010

(86) PCT No.: PCT/EP2010/000386
§ 371 (c)(1),
(2), (4) Date: Jul. 13, 2011

(87) PCT Pub. No.: WO2010/084013
PCT Pub. Date: Jul. 29, 2010

(65) Prior Publication Data
US 2011/0265358 A1    Nov. 3, 2011

(30) Foreign Application Priority Data

Jan. 23, 2009  (DE) .................. 10 2009 005 970

(51) Int. Cl.
| | |
|---|---|
| *B60R 13/10* | (2006.01) |
| *G09F 3/00* | (2006.01) |
| *G09F 3/10* | (2006.01) |
| *G09F 7/16* | (2006.01) |
| *B60R 11/00* | (2006.01) |

(52) U.S. Cl.
CPC ............ *B60R 13/10* (2013.01); *G09F 3/0292* (2013.01); *G09F 3/10* (2013.01); *G09F 7/165* (2013.01); *B60R 2011/0096* (2013.01)

(58) Field of Classification Search
CPC ........................ B60R 13/10; B60R 2011/0096
USPC .................. 40/200, 201, 203, 207, 208, 210
See application file for complete search history.

(56) References Cited

U.S. PATENT DOCUMENTS

| | | | | |
|---|---|---|---|---|
| 1,473,479 | A | * | 11/1923 | Hunter ............................ 40/202 |
| 1,985,227 | A | * | 12/1934 | Bland ............................. 40/200 |
| 2,535,265 | A | * | 12/1950 | Caffrey .......................... 40/207 |

(Continued)

FOREIGN PATENT DOCUMENTS

| | | |
|---|---|---|
| CN | 1606756 A | 4/2005 |
| CN | 1703729 A | 11/2005 |

(Continued)

OTHER PUBLICATIONS

PCT ISR on priority document (Mar. 25, 2010).

(Continued)

*Primary Examiner* — Gary C Hoge
(74) *Attorney, Agent, or Firm* — Laurence P. Colton; Smith Tempel Blaha LLC

(57) ABSTRACT

An identification plate, in which at least one security sign is arranged within the contours of a cover layer. As a result, the security sign is embedded in the cover layer and thus becomes an integral component of the identification plate. Such a security sign can no longer be removed from the identification plate. The identification plate according to the invention thus offers as much protection against manipulation as possible.

6 Claims, 4 Drawing Sheets

(56) References Cited

U.S. PATENT DOCUMENTS

| | | | |
|---|---|---|---|
| 2,780,018 A * | 2/1957 | Bauserman | 40/207 |
| 3,895,987 A * | 7/1975 | Loreck | 156/223 |
| 4,368,979 A * | 1/1983 | Ruell | 356/71 |
| 5,169,707 A | 12/1992 | Faykish | |
| 5,672,381 A * | 9/1997 | Rajan | 427/198 |
| 6,120,882 A * | 9/2000 | Faykish et al. | 428/195.1 |
| 7,204,909 B1 | 4/2007 | Curiel | |
| 2003/0170413 A1 | 9/2003 | Nakayama | |
| 2005/0087604 A1* | 4/2005 | Nguyen et al. | 235/487 |
| 2008/0078492 A1* | 4/2008 | D'Amato | 156/60 |
| 2009/0193694 A1* | 8/2009 | Cordell et al. | 40/201 |
| 2012/0198737 A1* | 8/2012 | Diaz Lopez | 40/208 |

FOREIGN PATENT DOCUMENTS

| | | | |
|---|---|---|---|
| CN | 1737881 A | | 2/2006 |
| CN | 101242972 A | | 8/2008 |
| DE | 4414149 A1 | | 11/1995 |
| DE | 202007017820 U1 | | 3/2008 |
| EP | 0717389 A1 | | 6/1996 |
| EP | 717389 A1 * | 6/1996 | G09F 3/02 |
| EP | 1500521 A2 | | 1/2005 |
| EP | 1550991 A1 | | 7/2005 |
| EP | 1727112 A1 | | 11/2006 |
| EP | 1856684 B1 | | 11/2007 |
| GB | 2276484 A | | 9/1994 |
| GB | 2342629 A | | 4/2000 |
| JP | H06507737 A | | 9/1994 |
| JP | 2003323003 A | | 11/2003 |
| JP | 2008543672 A | | 12/2008 |
| WO | 2005083661 A1 | | 9/2005 |
| WO | 20050836611 A1 | | 9/2005 |
| WO | 2006/136847 A2 | | 12/2006 |
| WO | 2006136847 A2 | | 12/2006 |

OTHER PUBLICATIONS

State Intellectual Property Office of the People's Republic of China, Notification of First Office Action on a related Chinese Patent Application No. 201080009717.2 (May 6, 2013).

Japanese Patent Office, Search Report on related application (Jan. 24, 2014).

State Intellectual Property Office of the People's Republic of China, Notification fo the Third Office Action (on related patent application), May 5, 2014.

Japan Patent Office, Official Actoin (on related application), Jan. 12, 2016.

Japanese Patent Office, Translation of an Office Action in a related application.

Deutsches Patent—Und Parkenamt (German Patent and Trademark Office), Office Action in connection with a related application, Aug. 1, 2017.

* cited by examiner

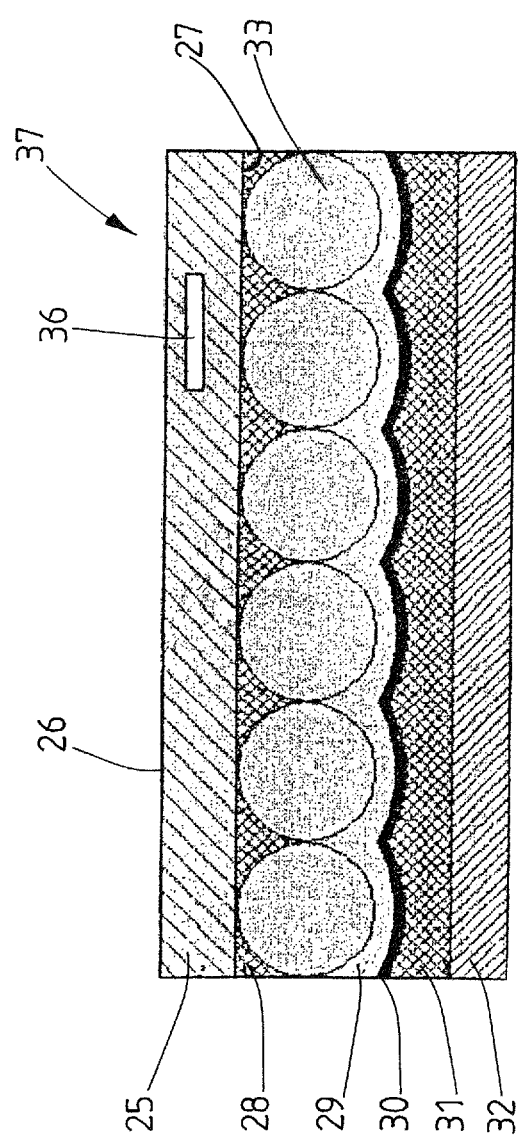

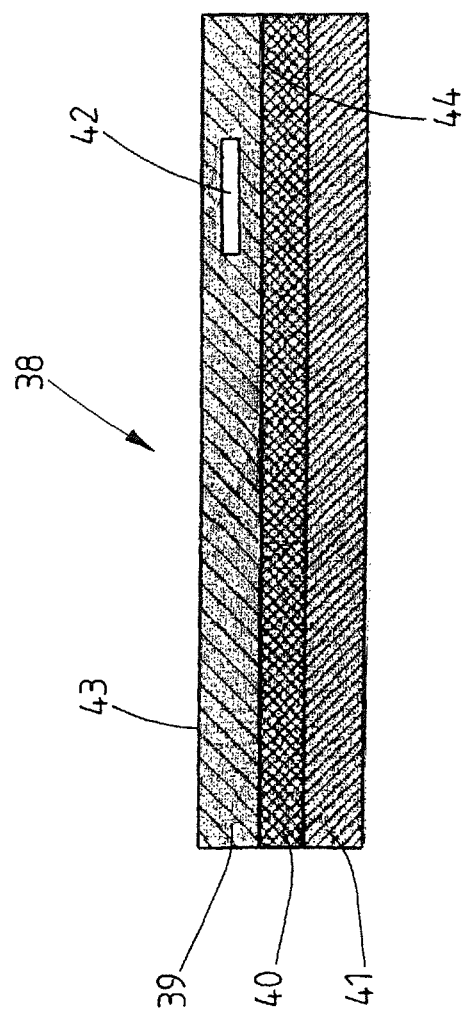

NUMBER PLATE PREFERABLY MOTOR VEHICLE NUMBER PLATE AND METHOD FOR PRODUCTION THEREOF

BACKGROUND OF THE INVENTION

1. Technical Field

The invention relates to an identification plate, preferably to a number plate for motor vehicles, having an identification plate body, which has text provided on it, and at least one security sign, characterized in that the at least one security sign is arranged within the contours of the identification plate body. The invention furthermore relates to a method for producing an identification plate having as identification plate body, which is formed of at least one cover layer and at least one further layer, and at least one security sign is provided, characterized in that the at least one security sign is molded into the identification plate body.

2. Prior Art

In order to counteract manipulation and thefts of identification plates, especially of number plates on motor vehicles, the identification plates are provided with security features, which are also referred to as originality features or authenticity features in the art. Known are a wide variety of such security features. One example is security signs in the form of stickers with at least one hologram. Such security signs are adhesively bonded to the identification plate from the outside. The risk here is that the stickers are removed. While such security signs have been designed such that they cannot be removed without being destroyed, it has become clear that there are methods for occasionally removing security signs from the identification plate in a destruction-free manner.

BRIEF SUMMARY OF THE INVENTION

The invention is based on the object of providing an identification plate, preferably a number plate for a motor vehicle, and a method for producing it, whereby the protection against manipulation is improved in a simple manner.

An identification plate for achieving the object is an identification plate, preferably a number plate for a motor vehicle, having an identification plate body, which has text provided on it, and at least one security sign, characterized in that the at least one security sign is arranged within the contours of the identification plate body. Accordingly, provision is made for the at least one security sign to be arranged within the contours of the identification plate body of the identification plate. As a result, the at least one security sign is no longer adhesively bonded to the identification plate but is instead embedded entirely or at least partially in said identification plate. As a result, the at least one security sign is integrated in the identification plate, for example. Hence, it can no longer be removed from the identification plate.

The at least one security sign is preferably embedded in the identification plate body, especially in the cover layer thereof. One way in which this can be done is that the at least one security sign is located entirely in the interior of the identification plate body or the cover layer by being surrounded on all sides by the material in particular of the cover layer. Another way is that the at least one security sign can be embedded in the identification plate body such that a face of the respective security sign is exposed, in particular terminates flush with an adjoining face of the identification plate body. In that case, an opposite face and the side faces of the respective security sign are surrounded by the material of the identification plate body. Here, the respective security sign is practically located within a depression or cutout in the identification plate body, in particular its cover layer, which depression or cutout corresponds to the dimensions of the security sign. If the at least one security sign is embedded in this manner into the cover layer, the latter does not need to be transparent.

In one preferred embodiment of the identification plate, where a security sign is arranged entirely in the interior of the identification plate body of the cover layer, provision is made to form the cover layer from two plies which lie one above the other, with the respective security sign being arranged between the cover layer plies such that it is embedded on all sides in the cover layer.

If the at least one security sign is embedded in the cover layer such that one face of the security sign terminates flush with the adjoining face of the cover layer, the exposed face of the respective security sign can be arranged on a visible front side of the cover layer, but also on a rear side of the cover layer. In the latter case, provision is made for that face of the respective security sign that is not covered by the material of the cover layer to be covered by another layer on the rear side of the cover layer. In the case of the exposed face of the respective security sign that terminates flush with the front side of the cover layer, said face can also be covered, either by way of a protective film or a protective lacquer on the front side of the cover layer or a reflection layer arranged over the front side of the cover layer, in particular a retroreflective film.

One preferred embodiment of the invention provides for the respective security sign to have a carrier, in particular a plate-like carrier, having at least one security feature. In principle, the security feature can have any desired form. However, provision is preferably made for the security feature to be in the form of a hologram. However, it is also conceivable that the hologram forms the entire security sign. In the case of a security sign of this type, which is in the form of a hologram or at least has a hologram, the arrangement within the contours in particular of the cover layer, especially the partial or complete embedding and/or integration in the cover layer, results in an identification plate, especially a number plate for a motor vehicle, that cannot be manipulated.

A method for achieving the object is a method for producing an identification plate having as identification plate body, which is formed of at least one cover layer and at least one further layer, and at least one security sign is provided, characterized in that the at least one security sign is molded into the identification plate body. In this method, the identification plate, especially the number plate for a motor vehicle, is provided with the at least one security sign by way of molding into the cover layer. This can take place in a particularly simple manner during the production of the cover layer. The respective security sign serves here practically as a "lost shell" in the production of the cover layer which is effected by way of molding.

In a preferred development of the method, provision is made for the respective security sign to be embedded between two plies of the cover layer. To this end, a first ply of the cover layer is molded, the at least one security sign is placed on it, and the second ply of the cover layer is molded over the first ply and the security sign. The respective security sign can be placed onto the first ply of the cover layer before the latter has completely cured. There is also no need for the first ply of the cover layer to be cured by the time the second ply of the cover layer is molded onto the first ply. In that case, the second ply is applied onto the first ply "wet on wet", as it were, and this brings about a homogenous connection between the two plies of the cover layer. This brings about irreversible complete embedding of the at least one security sign in the cover layer, as a result of which the at least one security sign is integrated in the cover layer physically and mechanically.

BRIEF DESCRIPTION OF THE DRAWINGS

Preferred exemplary embodiments of the invention will be explained in further detail below by reference to the drawing, in which:

FIG. 3 shows a cross section through a third exemplary embodiment of the identification plate analogously to FIG. 2.

FIG. 4 shows a cross section through a fourth exemplary embodiment of an identification plate with, again, greatly enlarged thicknesses of the individual layers.

DETAILED DESCRIPTION OF PREFERRED EMBODIMENTS

Figure 1:
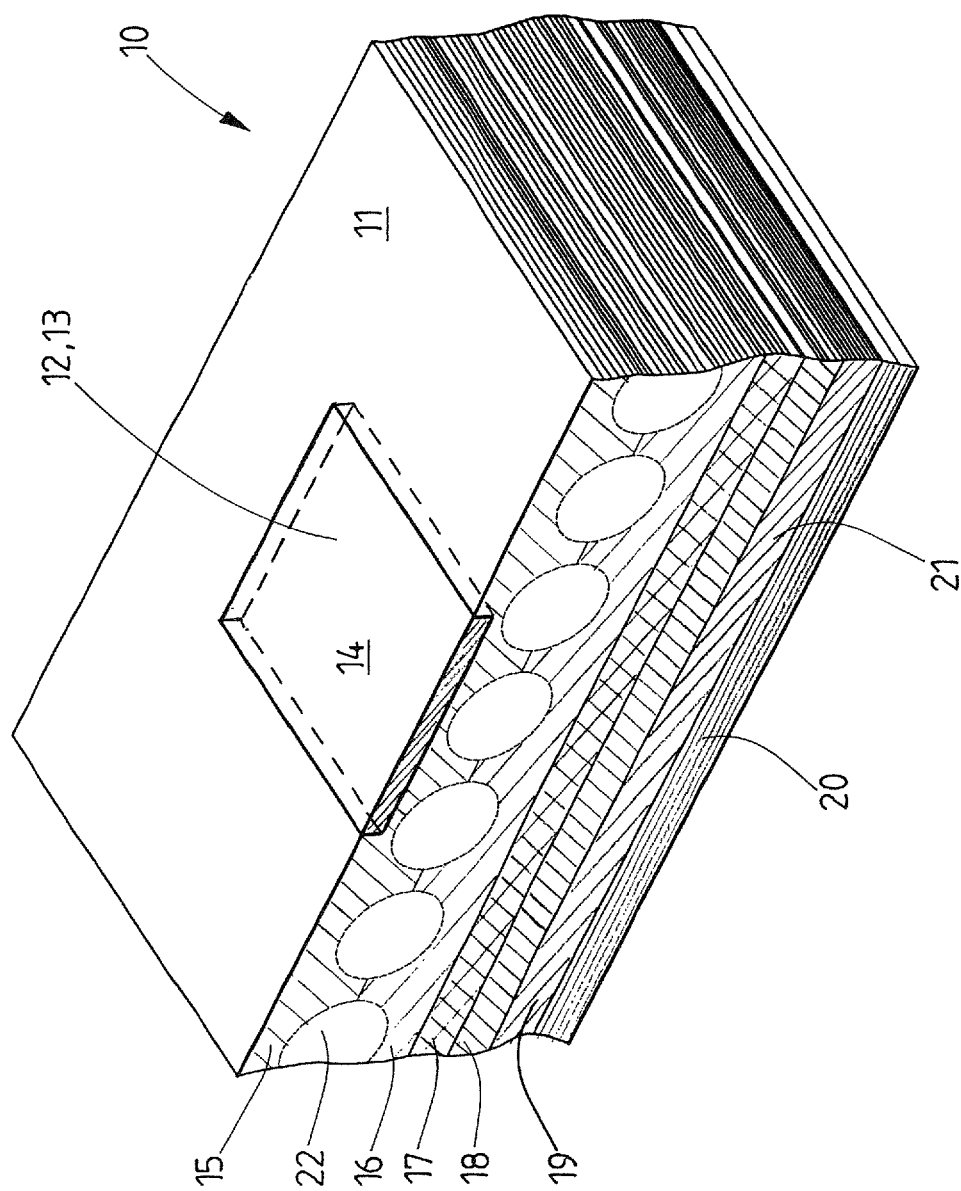
FIG. 1 shows a perspective detail of an identification plate with greatly enlarged thicknesses of the individual layers thereof.

The figures show only a few different exemplary embodiments of an identification plate, specifically in particular of a number plate for motor vehicles. The identification plate largely consists of plastic. In addition, a preferably flexible identification plate body 10 is formed of a plurality of plies or layers. The identification plate body 10 has individual items of text which are preferably printed on a front face 11 of the identification plate body 10 which forms the front side of the identification plate. The text can also be made up of digits which are adhesively bonded thereto or of other graphics.

Furthermore, the identification plate has what is referred to as a security feature, which is formed, in the exemplary embodiment shown, as a plate-type security sign 12. If appropriate, the identification plate can also have a plurality of security signs 12. The security sign 12 can have any desired dimensions and areas. In the exemplary embodiment shown (FIG. 1), the security sign 12 has a rectangular area. The security sign 12 is formed from a carrier, from which it obtains its plate-type form, and at least one hologram (not shown in the figures) or another security feature. The security sign 12 can also have a plurality of different security features.

The invention makes provision for the at least one security sign 12 to be assigned to the identification plate body 10, in particular to be placed in the identification plate body 10, such that it is located within the contours of the identification plate body 10. Accordingly, and in contrast with the security sign which is adhesively bonded thereto, the security sign 12 does not protrude from any face of the identification plate body 10. The at least one security sign 12 is preferably integrated in the identification plate body, specifically in a manner such that it is embedded in the identification plate body 10, i.e. is located entirely in the interior of the identification plate body 11 by being surrounded completely by the material of the identification plate body (FIGS. 2 to 4), or a visible face 14 of the security sign 12 terminates flush with the front face 11 of the identification plate body 10 and, as a result, the face 14 of the security sign 12, which forms part of the front face 11 of the identification plate, is not surrounded or covered by the material of the identification plate body 10 (FIG. 1).

FIG. 1 shows a perspective view of a section of the identification plate with a part of the identification plate body 10 and of the security sign 12 that is arranged within the contours thereof. The identification plate body 10 of the identification plate has a cover layer 15 which forms the visible front face 11 of the identification plate, arranged behind it an intermediate layer 16, a reflection layer 17, a carrier layer 18, an adhesive layer 19 and a protective liner 20 on the rear side 21 of the identification plate body 10. The protective liner 20 is removed in order to adhesively bond the identification plate for example to a body part of a vehicle such that it is not part of the identification plate body 10. In the identification plate body 10 shown in FIG. 1, reflection means, which are glass spheres in the illustrated exemplary embodiment, are embedded in the cover layer 15 and the intermediate layer 16. The glass spheres 22 are embedded between the cover layer 15 and the intermediate layer 16.

In the illustrated exemplary embodiment, the security sign 12 is placed into the front face 11 of the cover layer 15 of the identification plate body 10. Here, the security sign 12 is embedded in the cover layer 15, specifically in a manner such that the vertical side faces and the rear face of the security sign 12, which faces the glass spheres 22, are covered by the material of the cover layer 15. The visible face 14 of the security sign 12, however, which terminates flush with the front face 11 of the identification plate, is not covered by the material of the cover layer 15. Although in this manner the security sign 12 is arranged in the cover layer 15 and is connected to the material thereof at the side faces and the rear face, the visible face 14 of the security sign 12 is left exposed by the cover layer 15. As a result, the cover layer 15 does not need to be transparent in order to be able to read the security sign 12. Since, owing to the security sign 12 being embedded in the cover layer 15, the visible face 14 terminates flush with the front face 11 of the cover layer 15, it is impossible to separate the security sign 12, which is embedded in the cover layer 15, from the identification plate, specifically the identification plate body 11.

The abovementioned embedding of the security sign 12 in the identification plate body 10 can also be present in identification plate bodies having a different structure, in particular other reflection bodies or even no reflection bodies and fewer layers, in the simplest case only the cover layer 15, the adhesive layer 19 and the protective liner 20.

Figure 2:
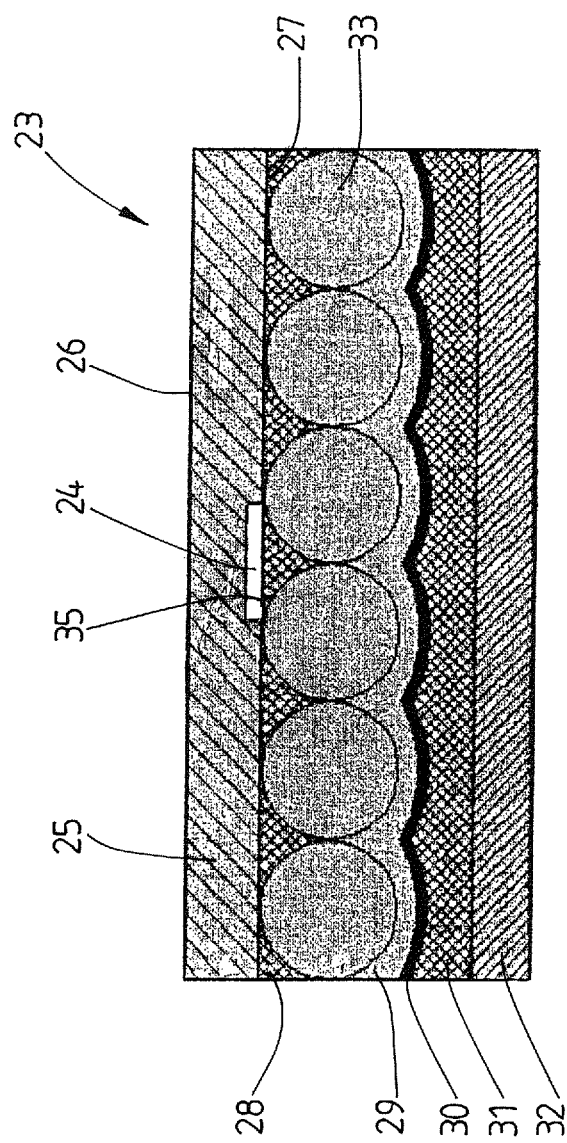
FIG. 2 shows a cross section through a second exemplary embodiment of the identification plate with, again, greatly enlarged thicknesses of the individual layers.

FIG. 2 shows a number plate for a motor vehicle having an identification plate body 23, in which a security sign 24 is embedded at a different location. The identification plate body 23 has a transparent, in particular clear, cover layer 25 with a visible front face 26, on which individual items of text is provided. Located behind a rear face 27 of the cover layer 25 is an adhesive lacquer layer 28, and behind this a spacer lacquer layer 29 to which an aluminum vapor deposit 30 is assigned on the rear, and an adhesive layer 31 which forms the rear of the identification plate body 23. In the case of the identification plate shown here, up to the point when the identification plate body 23 is adhesively bonded to a part of the motor vehicle, the free rear of the adhesive layer 31 also has applied to it a protective liner 32 or the like. Here, too, glass spheres 33, in particular glass microspheres, are embedded in the identification plate body 23, specifically between the adhesive lacquer layer 28 and the spacer lacquer layer 29.

In the case of the identification plate body 23, the security sign 24, which is preferably in the form of a hologram, in particular a hologram that is assigned to the carrier 13, is also arranged in the cover layer 25. In the case of the illustrated identification plate, the security sign 24 is located in the rear face 27 of the cover layer 25 which abuts the adhesive lacquer layer 28. The security sign 24 is embedded in the cover layer 25, wherein a rearward face 35 of the security sign 24 terminates flush with the rear face 27 of the cover layer 25. This face 35, which is not covered by the cover layer 25, is covered by the adhesive lacquer layer 28. As a result, in the case of the identification plate shown, the security sign 24 is covered completely, in part by the cover layer 25 and in part by the adhesive lacquer layer 28. In order that the security sign 24, which is located behind the front face 26 of the cover layer 25, is visible from the front side of the identification plate, the cover layer 25 consists of a completely see-through, in particular transparent, material, in particular plastic.

FIG. 3 shows an identification plate having an identification plate body 37, which has the same structure as the identification plate body 23 from FIG. 2. Therefore, identical reference numbers are used for those parts of the identification plate body 37 which correspond to the identification plate body 23 in FIG. 2.

Located in the identification plate body 37 is a security sign 36 which can be of the same form as the security sign 24. The security sign 36 is also located completely in the interior of the identification plate body 37, with the security sign 36 being placed completely in the interior of the cover layer 25 in the exemplary embodiment shown (FIG. 3). In the case of the identification plate body 37 of FIG. 3, the security sign 36 is completely surrounded by the material of the cover layer 25 by way of the security sign 36 being arranged in the interior of the cover layer 25 at a distance below the front face 26 thereof. The security sign 36 is likewise spaced apart from the rear face 27 of the cover layer 25. In the exemplary embodiment shown, the security sign 36 is located eccentrically in the cover layer 25, with the distance from the security sign 36 to the front face 26 being less than to the rear face 27 of the cover layer 25. However, the security sign 36 can also be arranged at a greater or smaller distance below the front face 26 of the cover layer 25, specifically in a manner such that the security sign 36 is surrounded on all sides by the material of the cover layer 25.

FIG. 4 shows a further exemplary embodiment of an identification plate, with the identification plate body 38 of which having a simplified structure. This identification plate body 38 has only one front cover layer 39, which has text on it and is transparent, preferably clear, and an adhesive layer 40 arranged behind it, in particular a pressure-sensitive adhesive layer. Provided behind the adhesive layer 40 is a protective liner 41 which is removed before the identification plate is adhesively bonded to a part of a vehicle.

In the case of the shown identification plate, the security sign 42 is embedded completely in the cover layer 39 by being located between the front face 43 and the rear face 44. However, the security sign 42 can also be embedded at another location in the cover layer 39 than that shown in FIG. 4, specifically in a manner such that a face of the security sign 42 terminates flush with the front face 43 or the rear face 44 of the cover layer 39, as is shown in the exemplary embodiments of FIGS. 1 and 2.

The identification plate shown in FIG. 4 can also have an identification plate body 38 whose front face 43 is covered by a reflective coating, in particular a reflective film. In the case where the face of the security sign 42 terminates flush with the front face 43 of the cover layer 39, this face of the security sign 42 is then covered by the reflective film.

The invention is also suitable for identification plates of any other construction, in particular those that have a grid of prisms, in particular microprisms, instead of the glass spheres 22 or 33.

The method according to the invention will be explained in more detail below with reference to FIGS. 1 to 3.

The respective security sign 12, 24 or 36 is integrated in each case into the cover layer 15 or 25 by being molded into the cover layer 15 or 25. In the case of the identification plate body 10, the security sign 12 is placed at an appropriate location onto a firm substrate, onto which the material of the cover layer 15 is molded. Subsequently, the material of the cover layer 15 is applied to the substrate and in the process the security sign 12 is overmolded by the material of the cover layer 15. This leads to the security sign 12 being embedded in the cover layer 15, wherein owing to the face 14 of the security sign 12, which is located on the support, terminates flush with the front face 11 of the cover layer 15, which is molded onto the substrate.

In the identification plate having the identification plate body 23 of FIG. 2, the material of the cover layer 25 is applied over the whole area of a firm substrate, specifically right up to a specified layer thickness. Subsequently, the security sign is placed into the not yet cured cover layer 25 and pressed into the still liquid material of the cover layer 25, such that the rearward face 35 of the security sign 24 terminates flush with the rear face 27 of the cover layer 25.

In order to produce the identification plate having the identification plate body 37 of FIG. 3, the process includes molding the cover layer 25 in two steps. To this end, the cover layer 25 of the identification plate body 37 is formed from two plies, with the security sign 36 being arranged between the plies and thus being embedded completely in the cover layer 25. For this purpose, first a first part, specifically a ply, of the cover layer 25 is molded onto a firm, level substrate. Placed onto this first ply is the security sign 36 while the material of the cover layer 25 is at least partially still in the liquid state. Subsequently, the second part, specifically the second ply, of the cover layer 25 is molded onto the first ply. In this manner, the security sign 36 is embedded completely between the two successively produced plies of the cover layer 25. The various plies for forming the cover layer 25 are molded wet-on-wet one above the other such that a homogeneous cover layer 25 with embedded security sign 36 is produced after curing.

LIST OF REFERENCE NUMBERS 10 identification plate body
11 front face
12 security sign
13 carrier
14 face
15 cover layer
16 intermediate layer
17 reflection layer
18 carrier layer
19 adhesive layer
20 protective liner
21 rear
22 glass sphere
23 identification plate body
24 security sign
25 cover layer
26 front face 27 rear face
28 adhesive lacquer layer
29 spacer lacquer layer
30 aluminum vapor deposit
31 adhesive layer
32 protective liner
33 glass sphere
34
35 face
36 security sign
37 identification plate body
38 identification plate body
39 cover layer
40 adhesive layer
41 protective liner
42 security sign
43 front face

The invention claimed is:

1. An identification plate for a motor vehicle, the identification plate having:
   an identification plate body comprising a cover layer superficial to at least one sublayer, the cover layer defining a visible front face for the identification plate, with text provided thereon; and
   at least one security sign,
   wherein the at least one security sign is arranged within contours of the identification plate body, and
   wherein the at least one security sign is embedded within the cover layer of the identification plate body such that a face of the security sign is exposed and terminates flush with the visible front face of the identification plate body.

2. An identification plate for a motor vehicle, the identification plate having:
   an identification plate body, which has text provided on it; and
   at least one security sign,
   wherein the at least one security sign is arranged within contours of the identification plate body,
   wherein the at least one security sign is embedded in a cover layer of the identification plate body, and
   wherein the cover layer is transparent.

3. The identification plate as claimed in claim 2, wherein the at least one security sign has a carrier with at least one security feature.

4. The identification plate as claimed in claim 3, wherein the at least one security feature is a hologram.

5. A method for producing an identification plate having an identification plate body, comprising:
   providing at least one security sign; and
   molding the at least one security sign into the identification plate body,
   wherein the identification plate body comprises a cover layer superficial to at least one sublayer, the cover layer defining a visible front face for the identification plate, and
   wherein the at least one security sign is embedded within the cover layer of the identification plate body such that a face of the at least one security sign is exposed and terminates flush with the visible front face of the identification plate body.

6. The method as claimed in claim 5, further comprising, when embedding the at least one security sign into the cover layer, placing the at least one security sign, in the cover layer during molding of part of the cover layer.

\* \* \* \* \*